Figure 1:
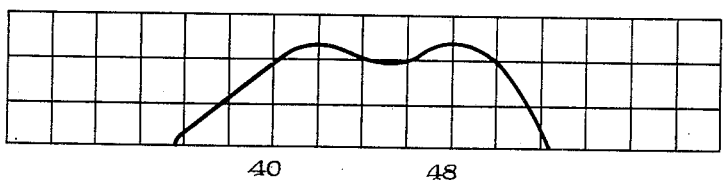
Figure 2:
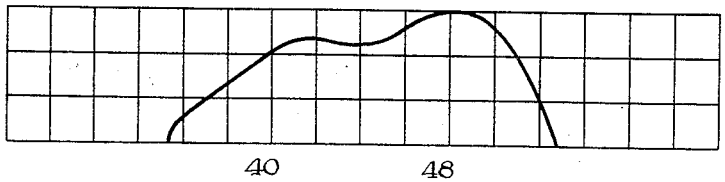

SILVER CHLORO-BROMIDE EMULSION SENSITIZED
WITH DYE CORRESPONDING TO EX. 1.

SILVER CHLORO-BROMIDE EMULSION SENSITIZED
WITH DYE CORRESPONDING TO EX. 2.

UNITED STATES PATENT OFFICE 2,312,068

PROCESS FOR SENSITIZING PHOTOGRAPHIC EMULSIONS

Fritz Bauer, Dessau, and Gustav Wilmanns, Wolfen, Kreis Bitterfeld, Germany, assignors, by mesne assignments, to General Aniline & Film Corporation, New York, N. Y., a corporation of Delaware Application October 5, 1939, Serial No. 298,114
In Germany October 5, 1938

3 Claims. (Cl. 95—7)

This invention relates to trimethine dyestuffs of unsymmetrical constitution.

It is an object of the invention to provide new and useful sensitizing dyes and silver halide emulsions with improved sensitizing properties.

Further objects will become apparent from the detailed specifications following hereinafter.

We have found that the aforesaid objects are accomplished by employing as sensitizers unsymmetrical trimethincyanines, which contain the 5-phenyloxodiazole nucleus, wherein the benzene ring may contain substituents; these compounds have better sensitizing properties than those of the analogous dyestuffs having the methyl-oxodiazole ring. The 5-phenyl-oxodiazole ring occurs on one side of the trimethine chain, while on the other side there is any nitrogenous hetero ring usual in the chemistry of cyanine dyestuffs, for example thiazoline-, thiazole-, selenazole-, indoline-, or quinoline-nucleus.

The dyestuffs of this invention are excellent for sensitizing the usual halogen silver emulsions, but especially for sensitizing silver chloride and silver bromide/silver chloride emulsions of which the spectral sensitivity is merely extended to such a degree that good processing is still possible in bright yellow or green dark chamber light. They are much superior to the known methyl-substituted oxodiazol-carbocyanines as regards sensitizing range and intensity.

The dyestuffs are obtainable by the process consisting in condensing the so-called ω-aldehyde of one of the usual nitrogenous heterocyclic compounds employed in the chemistry of cyanine dyestuffs and especially one derived from thioazole, oxazole, selenazole, indoline, quinoline or thiazoline with the quaternary salt of the 2-methyl-5-phenyl-oxodiazole in presence of pyridine and acetic anhydride.

The 2-methyl-5-phenyl-oxodiazole may be made by distilling in a vacuum a mixture of acetylbenzoylhydrazine (J. prakt. Chem. 50, page 298) with more than half its weight of phosphorus pentoxide. The quaternary compound of the base is produced in the usual manner, for instance by heating in a sealed vessel with alkyl halide.

The following examples when taken with the accompanying self-explanatory drawing, Figure I of which depicts by way of a sensitivity curve the sensitivity of an emulsion sensitized with the sensitizer of Example 1, and Figure II of which depicts by way of a sensitivity curve the sensitivity of an emulsion sensitized with the sensitizer of Example 2 serve to illustrate the invention:

Example 1

The dyestuffs of the following constitution has a sensitizing maximum at about 475 mμ

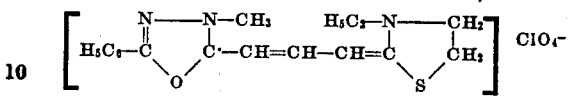

The dyestuffs is made in the following manner: 3.2 grams of N-ethyl-2-methine-thiazoline-ω-aldehyde are dissolved in 10 cc. of pyridine and 120 drops of acetic anhydride. While cooling with a freezing mixture and stirring 6.1 grams of 2-methyl-5-phenyl-oxodiazolemethiodide are added by portions to the solution. After stirring in the cold for 1 hour 10 cc. of methanol are added followed by 50 cc. of sodium perchlorate solution of 10 per cent strength. By the addition of some pieces of ice the dyestuff is caused to crystallise. It is filtered with suction and repeatedly recrystallised from methanol.

The absorption maximum in methanol equals about 455 μ.

A dyestuff of the following constitution has a sensitizing maximum at 475 mω

Example 2

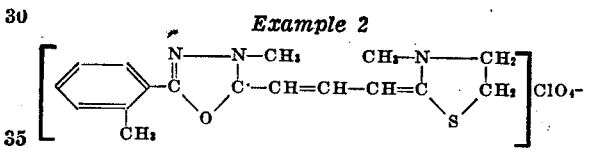

The dyestuff is made as follows: 2.9 grams of N-methyl-2-methine-thiazoline-ω-aldehyde are dissolved in 10 cc. of pyridina and 120 drops of acetic anhydride. While stirring and cooling there are added 6.4 grams of 2-methyl-5-orthotoluyl-oxodiazole-methiodide. The further working up is similar to that described in Example 1.

Absorption maximum in methanol about 455 mμ.

Example 3

The dyestuff of the following constitution has a sensitizing maximum at 470 mμ.

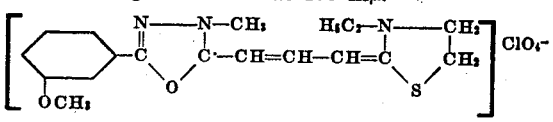

The dyestuff is made as follows: 2.2 grams of

N - ethyl-2-methine - thiazoline-ω-aldehyde are dissolved in 10 cc. of pyridine and 120 drops of acetic anhydride. While cooling and stirring there are added 6.7 grams of 2-methyl-5-meta-methoxy-phenyl - oxodiazole - methiodide. Further working up follows Example 1.

Absorption maximum in methanol about 460 mμ.

Example 4

The dyestuff of the following constitution has a sensitizing maximum at 475 mμ.

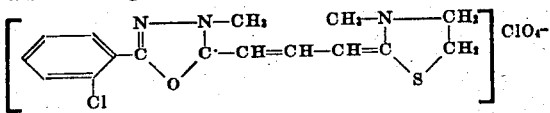

The dyestuff is made as follows: 2.9 grams of N-methyl-2-methine-thiazoline-ω - aldehyde are dissolved in 10 cc. of pyridine and 120 drops of acetic anhydride. While cooling and stirring there are added 6.8 grams of 2-methyl-5-ortho-chlorophenyl-oxodiazole-methiodide. The further working up is as described in Example 1.

Example 5

The dyestuff of the following constitution has a sensitizing maximum at 565 mμ.

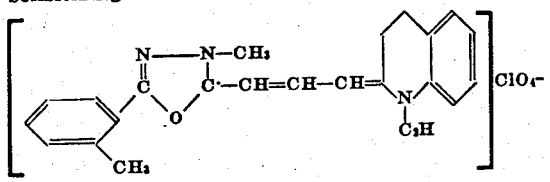

This dyestuff is made as follows: 2 grams of N-ethyl-2-methine-quinoline-ω-aldehyde are dissolved in 5 cc. of pyridine and 60 drops of acetic anhydride. While stirring and cooling 3.2 grams of methyl-5-ortho-toluyl-oxodiazole-methiodide are added. Further working up is as described in Example 1.

Absorption maximum in methanol about 530 mμ.

Example 6

A dyestuff of the following constitution has sensitizing maximum at 525 mμ.

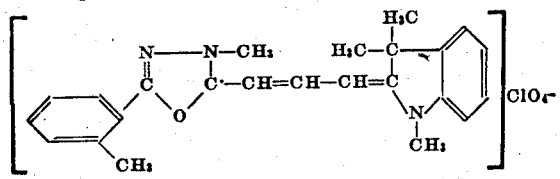

This dyestuff is made as follows: 2 grams of 1:3:3-trimethyl-2-methine-indoline-ω - aldehyde are dissolved in 5 cc. of pyridine and 60 drops of acetic anhydride. While stirring and cooling 3.2 grams of 2-methyl-5-ortho-toluyl-oxodiazole-methiodide are added. The further working up is the same as in Example 1.

Absorption maximum in methanol about 490 mμ.

Example 7

The dyestuff of the following constitution has a sensitizing maximum at 540 mμ.

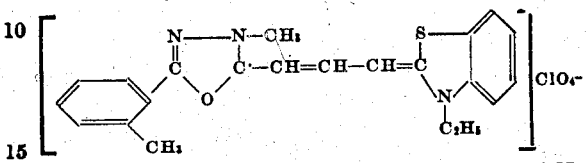

This dyestuff is made as follows: 2 grams of N-ethyl-2-methine-benzthiazole - ω - aldehyde are dissolved in 5 cc. of pyridina and 60 drops of acetic anhydride. While cooling and stirring 3.2 grams of 2-methyl-5-ortho-toluyl-oxodiazole - methiodide are added. Further working up is as described in Example 1.

Absorption maximum in methanol about 505 mμ.

We claim:
1. A silver halide emulsion containing as a sensitizer therefor a salt of a dyestuff of the following structural formula:

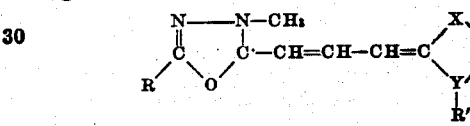

wherein R is a phenyl radicle, X is the remainder of a heterocyclic system usual in cyanine dyes and YR' is selected from the class consisting of S and N alkyl.

2. The compositions as defined in claim 1, wherein the silver halide is silver chloride sensitized with a dyestuff of the following constitution

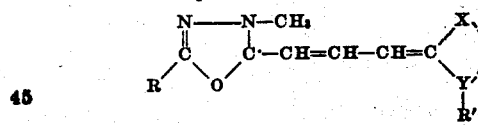

wherein R is a phenyl radicle, X is the remainder of a heterocyclic system usual in cyanine dyes and YR' is selected from the class consisting of S and N alkyl.

3. Silver halide emulsions containing a sensitizer of the following formula:

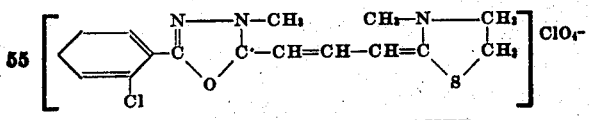

FRITZ BAUER.
GUSTAV WILMANNS.